United States Patent [19]
vom Hagen

[11] 3,861,195
[45] Jan. 21, 1975

[54] INSTRUMENT FOR MEASURING GAS METABOLISM OR CHANGES IN GASEOUS AMOUNTS

[76] Inventor: Siegbert Graf vom Hagen, Ernst-Ludwig-Strasse 17, 614 Bensheim, Germany

[22] Filed: Aug. 18, 1972

[21] Appl. No.: 281,802

[30] Foreign Application Priority Data
Aug. 18, 1971 Germany............................ 2141346

[52] U.S. Cl................................ 73/23, 137/487.5
[51] Int. Cl........................ G01n 31/00, G05d 16/00
[58] Field of Search.............. 73/23, 432 R, 4 R, 37, 73/388, 205 R, 19, 432, 401; 23/256, 232 R; 137/487.5; 195/109, 142, 103.5 R, 143, 144

[56] References Cited
UNITED STATES PATENTS

| | | | |
|---|---|---|---|
| 2,297,098 | 9/1942 | Carney | 73/23 X |
| 2,818,726 | 1/1958 | Amonette et al. | 73/4 R |
| 2,955,457 | 10/1960 | Peters et al. | 73/23 |
| 3,026,711 | 3/1962 | Stampe et al. | 73/23 |
| 3,232,091 | 2/1966 | Glassey | 137/487.5 X |
| 3,349,625 | 10/1967 | Benusa et al. | 73/23 X |
| 3,382,718 | 5/1968 | Bartsch | 73/401 |
| 3,531,257 | 9/1970 | Harvey et al. | 23/256 |
| 3,586,027 | 6/1971 | Fitzgerald et al. | 137/487.5 X |

*Primary Examiner*—Richard C. Queisser
*Assistant Examiner*—Stephen A. Kreitman
*Attorney, Agent, or Firm*—Stevens, Davis, Miller & Mosher

[57] ABSTRACT

An apparatus for measuring gas metabolism or changes in gaseous amounts in a chamber. Makeup oxygen or another gas is supplied into the chamber over a long period of time from a pressure source. The test chamber is connected to a pressure sensor to determine when a given amount of the gas has been consumed and the sensor causes a measured amount of makeup gas from the source to be added to the chamber.

15 Claims, 7 Drawing Figures

INSTRUMENT FOR MEASURING GAS METABOLISM OR CHANGES IN GASEOUS AMOUNTS

This invention concerns an instrument having a test sample chamber for measuring gas metabolism or changes in gaseous amounts.

Instruments for measuring gas metabolism are known, for instance the so-called Warburg-instrument described in German patent 1,222,697 where the oxygen consumption of cell tissue stored in an air-containing chamber is determined by manometric measurements. Oxygen makeup in this known device occurs at fairly large time intervals, namely when the pressure in the test vessel has dropped to about half its initial value. While this procedure is not a drawback when testing cell respiration, such no longer is the case when measuring the respiration of living organisms and in particular that of higher ones, such as small mammals, since oxygen is a strong function of the atmospheric pressure to which the animal is exposed and hence a function of the pressure in the test sample chamber. By supplying makeup oxygen from a bottle of compressed gas, the time during which gas-quantity changes may be measured with a Warburg device has been extended to a few hours. However, no instrument has been provided that will fill the many applications in the boilogical and technical physical fields. The Warburg device and similar ones also suffer from the drawback that the liquid manometers used for manometric measurements will not operate outside the earth's field of gravity and therefore are unsuited for use aboard satellites in space.

This invention relates to an instrument for measuring gas metabolism or changes in gaseous amounts in which the instrument may be operated under the most varied conditions and over long periods of time.

The problems of the prior art instruments have been overcome by utilizing a compressed gas source to provide makeup oxygen at a constant pressure. This source consists of a container of compressed gas and a fine adjustment valve. Additionally a shut-off valve is located in the connecting conduit to the test sample chamber. The shut-off valve is controlled by a pressure sensor. The sensor measures the difference in pressure between the chamber and the atmosphere as a reference. The sensor is adjusted for a desired difference between these two valves. When the pressure difference is greater than the desired valve, the valve is opened and when the reference pressure is reached within the chamber the valve is closed.

Oxygen or another gas to be consumed by the test sample will be immediately introduced into the test sample chamber and the pressure difference for which the instrument responds is measured with respect to the atmosphere.

In another embodiment of the new measuring instrument, a second chamber is provided as an interim storage room for the compressed gas between the compressed gas source and the shut-off valve with a second shut-off valve placed between the compressed gas source and the interim storage room. This second shut-off will be opened by another pressure sensor when the measured pressure difference is greater than the adjustable pressure difference selected between atmosphere taken as reference and the pressure in the interim storage room. Similarly the valve will be closed when the reference pressure has been reached in the interim storage room. When the reference pressure for the first pressure sensor is in the pressure in the interim storage room then the adjusted pressure difference range for the first pressure sensor is usually smaller by a decade than that for which the second one is set.

In many cases it is suitable or necessary that the measuring instrument be so structured that the pressure in the test chamber be entirely independent of atmospheric. In such cases the invention provides for a third chamber as a manometer chamber on the other leg of the liquid-manometer serving as a further pressure source. In this embodiment of the measuring instrument, the temperature difference between the three chambers may not exceed a given value, say 0.1°C if measuring accuracy is to be preserved. To that end, one may place the three chambers inside a block of heat-conducting material such as copper, or else a cooling device will be provided. Preferably this cooling device can also serve as a heating device so that heating and cooling may be determined and adjusted in order that the final desired temperature is quickly obtained. The heating and cooling device is particularly useful when performing experiments with exothermic chemical reactions or when biological heat is being generated in the test sample chamber.

In order to achieve rapid temperature equilization between the chambers, they should be of the same or nearly the same volume. If necessary, glass spheres or similar bodies may be introduced into the interim storage chamber in order to achieve equality of volume with the chamber containing the test sample. Further all three should be provided with propellers for the rotation and circulation of air or other gas in those three chambers to ensure an even temperature distribution. A vibrator may also be used to this end.

There are many suitable devices which may be used for scanning the liquid levels of the U-shaped liquid manometers serving as pressure sensors, with light beams being one example. The shut-off valves actuated by the pressure sensors via the scanning and switching devices preferably are magnetic valves. When the pressure-difference ranges or responses for the first and second pressure sensors are set at about 1:13, one may use Brodie's solution in the first liquid-manometer and mercury in the second.

For measuring instruments to be used outside the earth's field of gravity as in satellites, capacitors in an oscillator circuit may be used in lieu of liquid sensors.

Preferably a calibration syringe is used as an auxilliary device for calibrating the pressure-difference range. A certain amount of gas is withdrawn by means of the calibration syringe from the test sample chamber with the reference pressure being either atmospheric or that in the interim storage room.

To the extent that the gas consuming processes also generate gases, an appropriate absorption means will be used for absorbing such gases. For example, if carbon dioxide is generated then calcium hydroxide may be used for its absorption. Any water vapor arising, for instance during animal respiration tests would be combined with blue gel or a similar substance. The absorption means are placed into the test sample chamber.

The measuring instrument must be so modified for gas-generating processes that the fine-adjustment valve and the compressed gas source are eliminated and that the connecting conduit be provided with an exhaust orifice into the atmosphere. The adjustments for pressure thresholds at the pressure sensors will be so set that excess pressures will be recognized.

Preferably the test chamber, the interim storage chamber and the manometer chamber will be made of Jena glass in order to achieve homogenous and simultaneous temperature equalization of the three chambers and to eliminate interfering diffusion processes as can occur, for example, in metals and plastics.

The drawings show embodiments of the invention:

Figure 1:
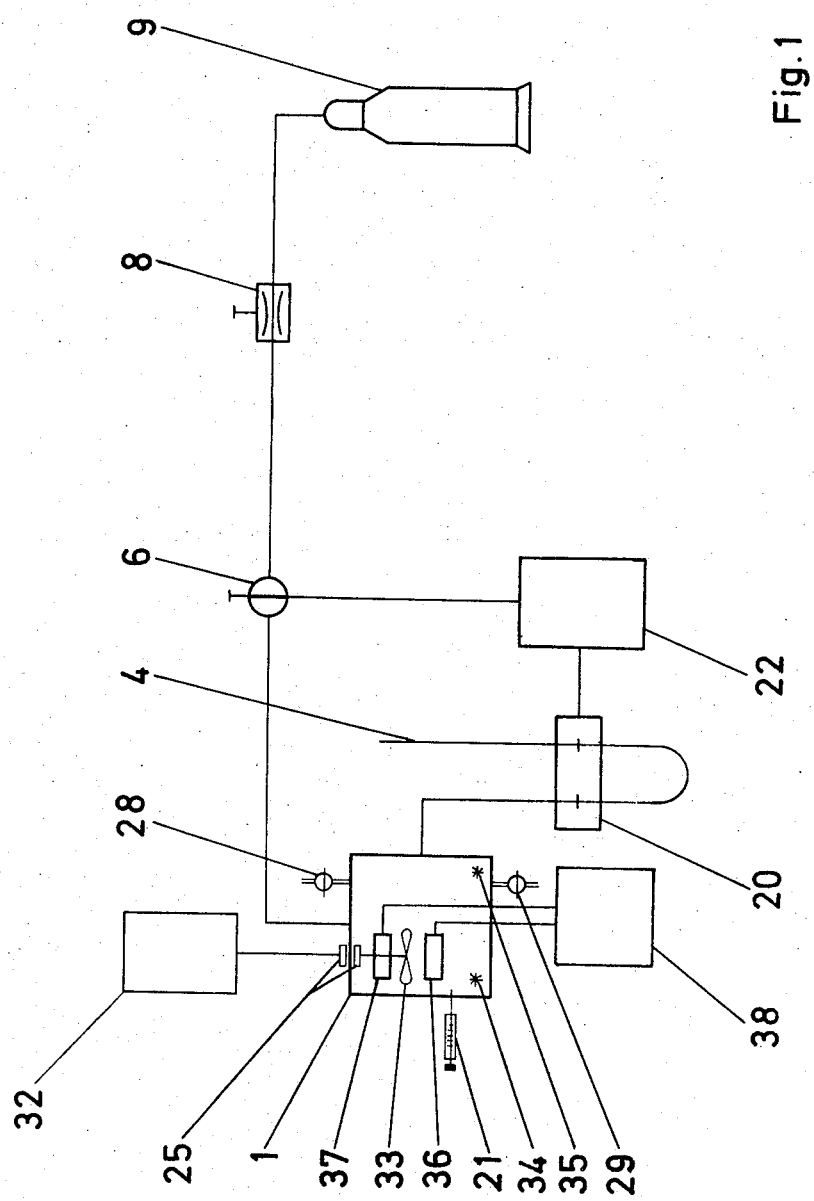
FIG. 1 shows a measuring instrument according to the invention where the makeup oxygen is supplied next to the chamber for the test sample.

Oxygen from a compressed gas source is supplied to chamber 1 for the test sample of the instrument shown in FIG. 1, the moment that the pressure in chamber 1 has dropped by an adjustable amount with respect to the atmosphere. A given amount of gas is withdrawn by means of an auxilliary device, namely calibration syringe 21 from chamber 1 for the purpose of setting the pressure difference range. The pressure sensor, a U-shaped liquid-manometer, is connected by its left leg to chamber 1 while its right leg is open to the atmosphere. By means of a device 20, for instance a light path, there is a monitoring of changes in liquid level. Device 20 is so set during calibration that when the desired pressure difference has been reached, for instance 0.1mm waterhead, it will actuate valve 6 via the switch 22, where valve 6 may be a magnetic valve. The latter will remain open until pressure equilibrium has been achieved with atmospheric in chamber 1 by means of the makeup oxygen from the compressed gas source, which consists of compressed gas bottle 9 and the subsequent fine-adjustment valve 8. The gas supply continues until the liquid levels in pressure sensor 4 again are even, or, in other words, until they are again in the null position as initially in the test. The amounts of oxygen withdrawn and resupplied are the same. Cocks 28 and 29 are used for rinsing in order to purify chamber 1 prior to testing of any undesired gases. If gases are generated during gas-consuming processes, then absorption means 34 and 35 will be employed to absorb the gases generated so that the lower pressure resulting from the test sample's gas consumption becomes measurable. Propeller 33 is driven by motor 32 via the magnetic clutch 25 and heating and cooling devices 36 and 37 are used to keep the temperature thermostatically at the nominal value. The generally required precision is 0.2°C. the instruments' measured value of gas consumption is the product of the number of opening pulses from valve 6 during the test period times the pressure difference obtained from the auxiliary device 21. The test sample is located in chamber 1 during the determination of pressure difference, in order that the measured refers to the true volume of chamber 1.

Figure 2:
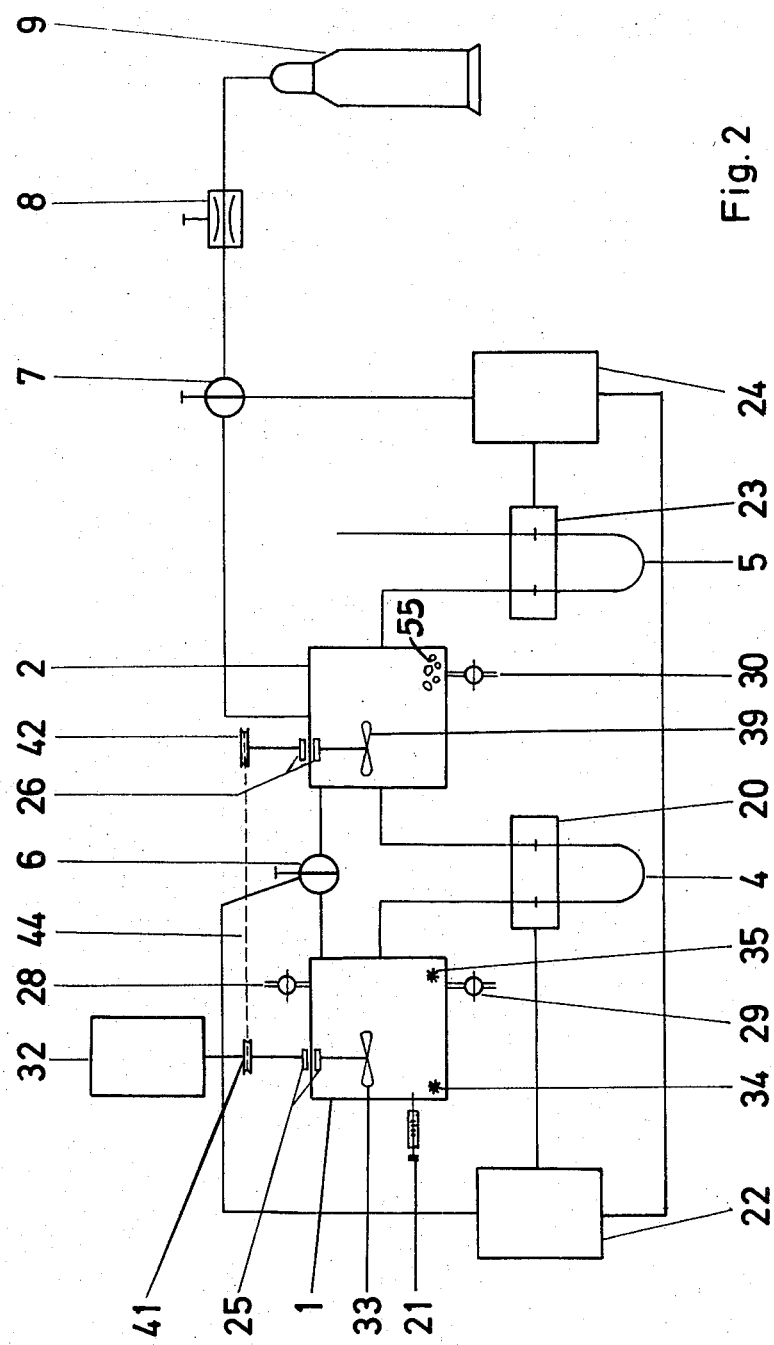
FIG. 2 shows a measuring instrument where one chamber is being used as the interim storage room for the makeup gas.

The instrument shown in FIG. 2 differs from that in FIG. 1 in that a chamber 2 has been inserted into the path of the oxygen to be made up so that this chamber serves more or less as a buffer or interim storage room for the makeup oxygen being fed to chamber 1 for the test sample. The magnetic valve 6 associated with pressure sensor 4 is located in the conduit between chambers 1 and 2. As was the case in FIG. 1, this valve 6 is controlled by a light beam 20 or a similar device and a switch 22 as a function of the manometer liquid levels. Pressure sensor is connected by its left leg to interim storage room 2 and by its right leg to atmospheric pressure and actuates valve 7 via a device 23 scanning the height of the liquid lievel of the manometer and via switch 24. Valve 7 may be magnetic and is inserted in the conduit between pressure gas sources 8, 9 and interim storage room 2. After adjusting pressure sensor 4 to the pressure difference range by means of a calibration syringe 21 shown in FIG. 1, the makeup of the gas consumed in chamber 1, for instance oxygen, shall be obtained from chamber 2. Valve 6 between chambers 1 and 2 will be open as long as there will be a pressure difference between them and the opening is controlled via the light beam 20 and the switch 22. This means that half the oxygen used up in chamber 1 will be resupplied from chamber 2. This is permissible because the test sample, for instance a cell tissue, being used in this instrument can still exist on slight deficiencies of oxygen. The moment during testing that the pressure in chamber 2 has dropped because of the repeated pressure equilizations between chambers 1 and 2 by an amount preferably corresponding to about 10 times the value of the selected pressure difference range between chamber 1 and chamber 2, the magnetic valve 7 will be opened by the corresponding adjusted pressure sensor 5 that has already been installed and by means of the latter's scanner 23 and switch 24. Now the oxygen flows from the compressed source 8, 9 via valve 7 into chamber 2 until the latter's pressure is equal to atmospheric. Preferably the arrangement is such that opening valve 7 also opens valve 6 between chambers 1 and 2, so that chamber 1 is filled to atmospheric pressure together with chamber 2. It may be shown from the ideal gas law $pV = nRT$ that the step-wise addition of quantities of oxygen during the time of testing are the same regardless of output pressure. The differences are much less than instrument error and may be neglected. As in FIG. 1, the measured values are obtained from the produce of the set presssure-difference range times the number of opening pulses of valve 6. Cock 30 is used to purify chamber 2 of foreign gases. Propeller 39 in chamber 2 is driven by motor 32 via the belt 44, drive-wheel 42 and magnetic clutch 26.

FIG. 2 also shows the spheres 55 for achieving equality of volume with the chamber containing the test sample.

Figure 3:
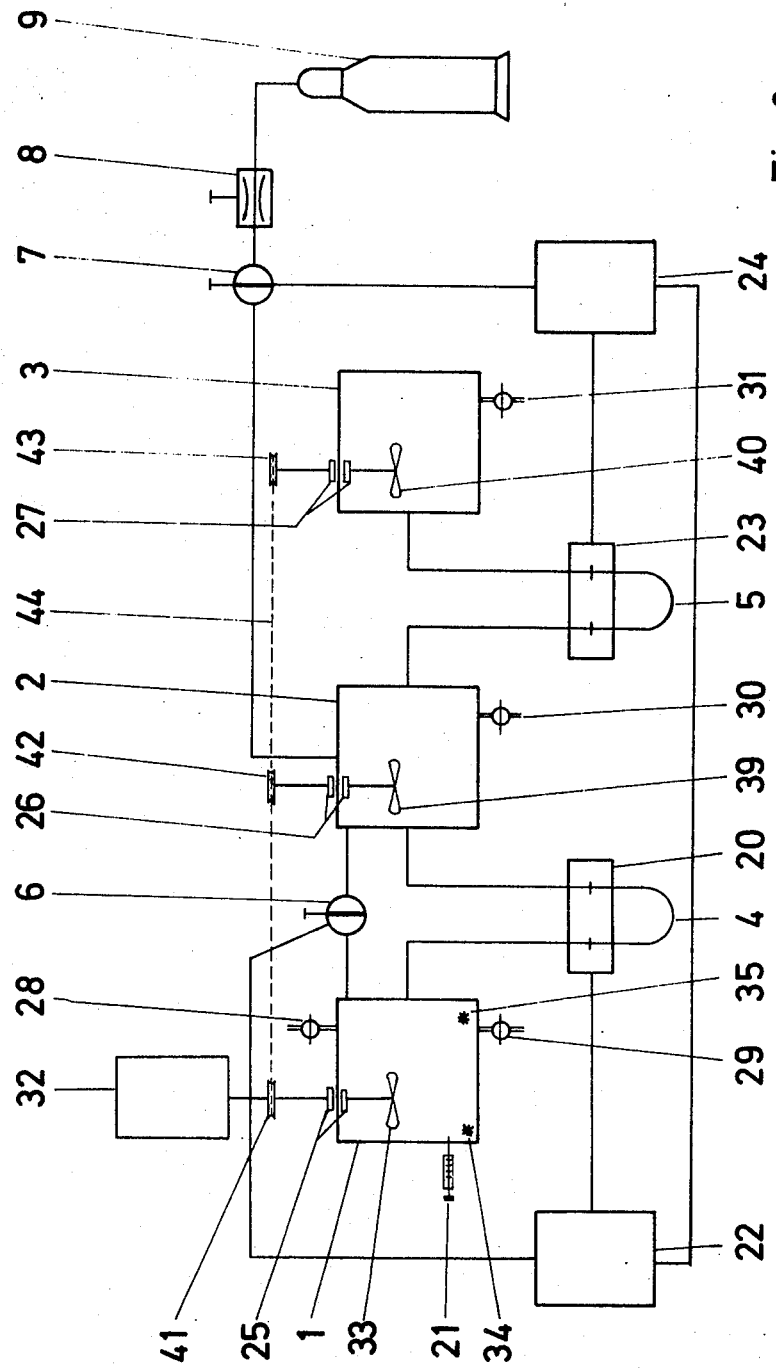
FIG. 3 is a measuring instrument differing from the embodiments of FIGS. 1 and 2 in that the reference pressure is not the atmosphere but the pressure in a special manometer chamber.

In the embodiment shown in FIG. 3, the right leg of pressure sensor 5 is connected to a manometer chamber 3. Therefore the reference pressure may be set to an arbitrary value. In order to avoid interferences during measurement, the volumes of chambers 1, 2 and 3 must be the same or very nearly so and rapid temperature equalization must be achieved. This can be obtained by placing these chambers in a copper block (not shown) or any other block of high heat conductivity, or by immersing them in a thermostatically controlled water bath if a definite test temperature is to be observed. The chambers proper should definitely be of glass of which Jena glass is a good example.

If exothermal processes or boilogical measurements take place in the test-sample chamber so that heat is given off into the testing space then thermostatic control is required to compensate for the rapid temperature fluctuations. The thermostatic control system in FIG. 1 consists of fan 33, heater 36, cooler 37 and regulating circuit 38, all so functioning together that for discontinuous emission of heat from the test sample the desired nominal temperature may be precisely kept to within 0.02°C. The thermostatic control system is so laid out that a desired nominal temperature in chamber 1 will result from the constant basic temperature of cooler 37, from the variable heat emission from the test sample and from the power of heater 36 being the adjustable component in regulating circuit 38 of the entire thermostatic system. Heater 36 is a quick-acting adjustable component as compared to the relatively slow cooler 37. When the test sample emits heat, chamber 2 or 3 in FIGS. 2 and 3 must be thermostatically controlled to within 0.02°C of the nominal temperature of chamber 1. This is preferably done by means of a thermostat control system outside chambers 2 and 3 which can be, for instance, a water bath.

Figure 4:
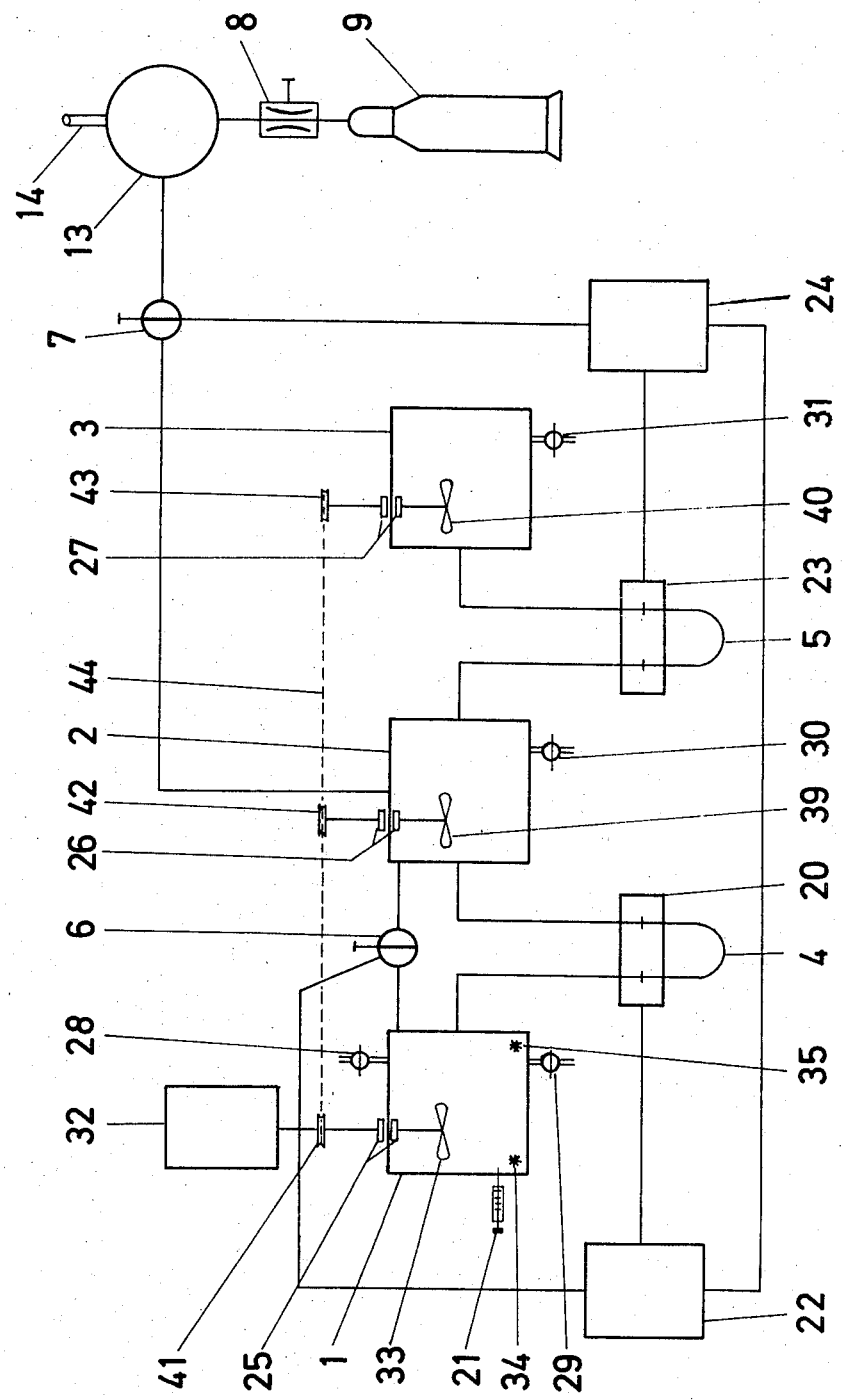
FIGS. 4, 5 and 6 are further variations of the measuring instrument of this invention.

FIG. 4 shows an embodiment of the measuring instrument which also has three chambers as the one in FIG. 3, but which is further provided with a gas-distributor sphere for better matching of the oxygen to be resupplied at atmospheric pressure since the oxygen conduit passes through this sphere. This gas exhaust distributor 13 is provided with an exhaust orifice 14 of such dimensions or so throttled that there will be practically an equal pressure in the inner space of sphere 13 and in the ambient atmosphere for the least possible oxygen loss.

Figure 5:
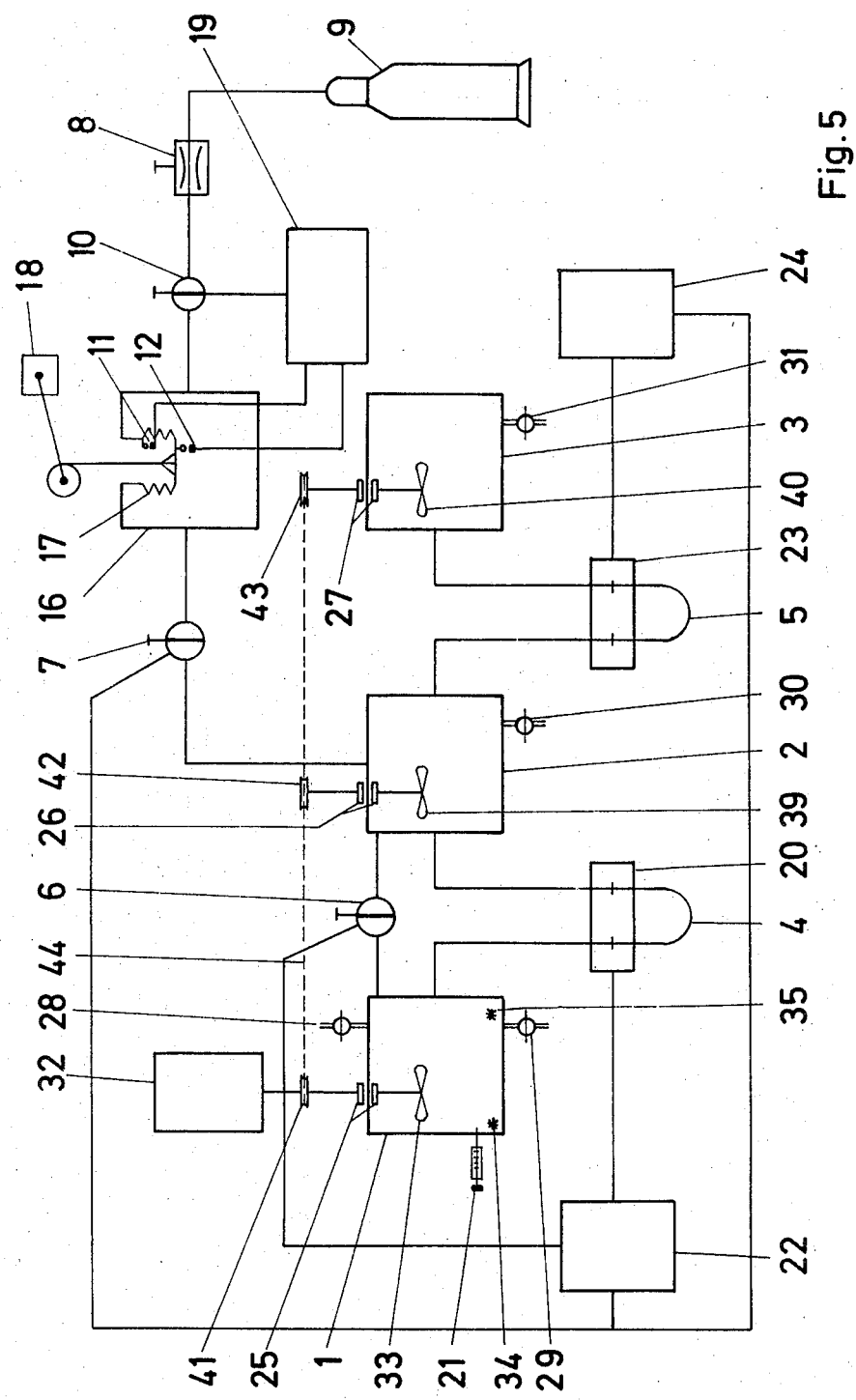

FIG. 5 shows that a space 16 bounded by a bellows membrane 17 is used as a means of pressure matching of oxygen to be resupplied at atmospheric pressure in lieu of the distributor 13. The weight of the bellows membrane 17 or that of the upper sealing lid connected to it for sealing the oxygen-filled space is compensated by the rotational movement of a moving coil instrument 18 or of a similar device. The construction of the remaining portion of the instrument shown in FIG. 5 corresponds to that of the instruments in FIGS. 3 and 4. Oxygen enters space 16 from the compressed gas source 8, 9 via valve 10 which is located between compressed gas source 8, 9 and space 16. The valve will be opened, 12, via the switching electronics 19 and the contact 12 the moment the contact is actuated by the membrane 17 and it will be closed the moment contact 1 is touched by membrane 17.

Figure 6:
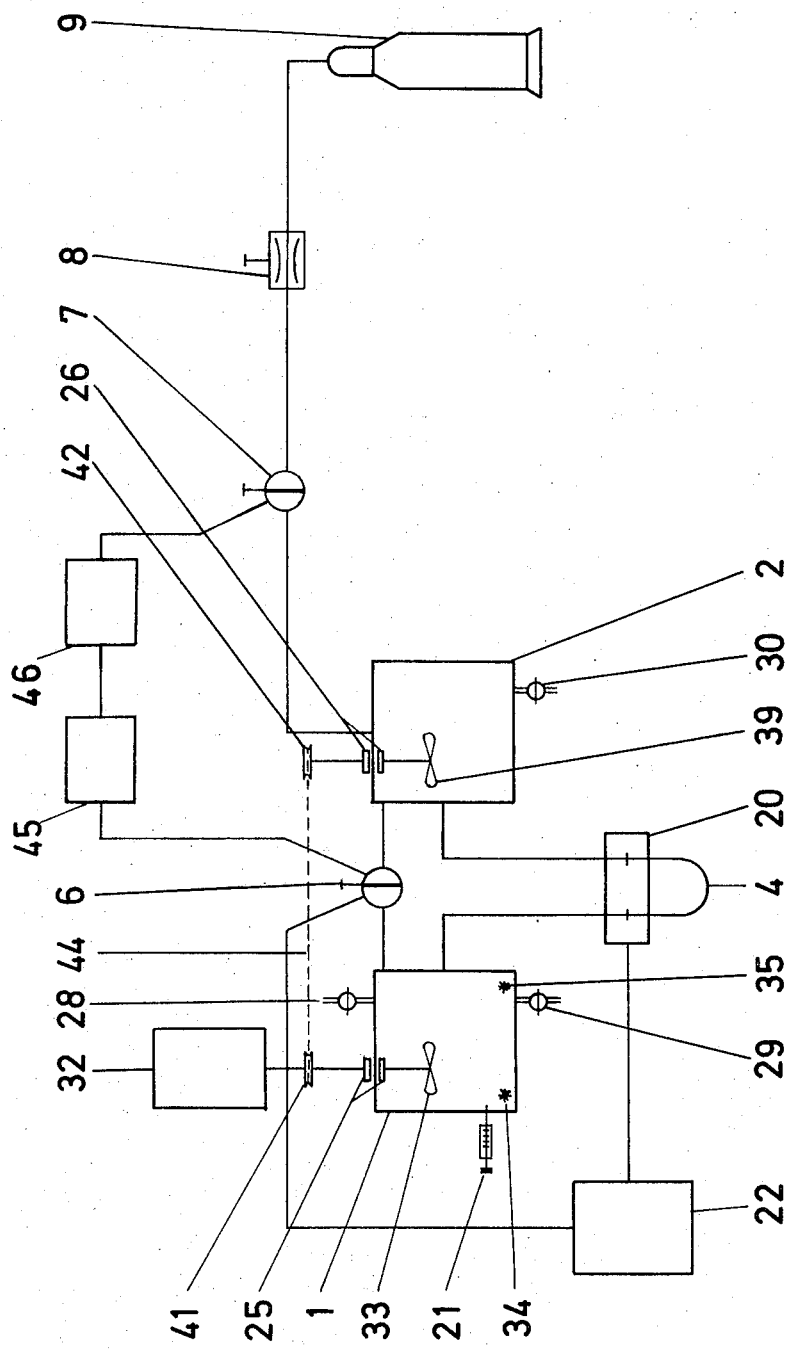

FIG. 6 shows a modified embodiment of the measuring instrument in which the actuation of the valve 7 located between compressed gas source 8, 9 and interim storage room 2 depends on the number of opening processes carried out by valve 6 in the oxygen resupply conduit between chamber 2 and chamber 1. After a number of opening or closing processes determined from adjustable, pre-selected devices 45 and 46 with respect to valve 6, valve 7 will be opened until there is a matching of the set by the fine-adjustment valve 8. Valve 8 is preferably also opened so that the output pressure in both chambers is the same. Here too the gas consumption of the test sample in chamber 1 is obtained by multiplying the quantity of gas set as the pressure-difference range by the number of valve 6 openings in that time interval.

Figure 7:
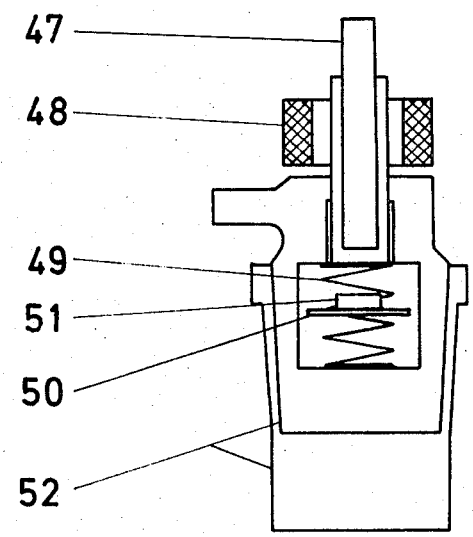
Figure 7:
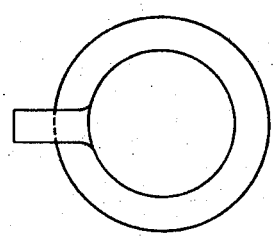

FIG. 7 shows the vibrator for mixed-gas rotation in chambers 1, 2 and 3 which may be used in lieu of propeller 33, 39 and 40 in FIGS. 1 through 6. Membrane 51 is suspended in spring 49 and excited by the oscillation of the permanent magnet 50 by the soft iron core 47 and coil 48.

The following advantages of the measuring instruments described in FIGS. 1 through 7 should be emphasized.

Measurements are performed in even, adjustable steps that may be calibrated and therefore measurement results are obtained in a simple manner and may be put into digital form. The conversion of the measured data as required in the Warburg-instrument, is eliminated. Simultaneously with the measurement, there is added the makeup amount of gas consumed by the test sample. The makeup gas may be an arbitrary mixture. Measurements are carried out over long time periods and the procedure is endowed with constant, high precision because of the adjustability of small measurement phases. The concept of the instrumentation may be applied to the most varied environmental and test conditions. The feasibility is provided for measuring gaseous and energetic metabolism for biological test samples. Thermostatic control devices used are simple and so is the rotation of gas in the chambers. Apparatus-shaking as done for the Warburg-instrument, is eliminated.

What is claimed is:

1. An apparatus for measuring gas metabolism or changes in gaseous amounts of a test sample in a chamber wherein makeup oxygen or another gas is supplied into the chamber over a long period of time from a constant pressure compressed gas source comprising:

a compressed gas container having a fine adjustment regulating valve;

a first chamber for containing the test sample;

a conduit between said first chamber and said fine adjustment valve;

a first shut-off valve to control said conduit;

a first pressure sensor to detect the difference between the pressure in the chamber and a first reference pressure;

means to open said first shut-off valve when the pressure difference reaches a first pre-adjusted level; and means to close said first shut-off valve when said first reference pressure is reached in said first chamber;

an interim storage chamber containing compressed gas interposed between said compressed gas source and said first shut-off valve;

a second shut-off valve between said compressed gas source and said interim storage chamber;

a second pressure sensor to detect the difference between the pressure in said interim storage chamber and a second reference pressure;

said second reference pressure being atmospheric;

means to open said second shut-off valve when the pressure difference reaches a second pre-adjusted level;

said first pre-adjusted level being approximately one-tenth the magnitude of the second pre-adjusted level;

means to close said second shut-off valve when said second reference pressure is reached in said interim storage chamber; and wherein the reference pressure for said first pressure sensor is the pressure in said interim storage chamber.

2. An apparatus according to claim 1, further comprising a manometer chamber which provides the reference pressure for said second pressure sensor and is independent of atmospheric pressure.

3. An apparatus for measuring gas metabolism or changes in gaseous amounts of a test sample in a chamber wherein makeup oxygen or another gas is supplied into the chamber over a long period of time from a constant pressure compressed gas source comprising:
- a compressed gas container having a fine adjustment regulating valve;
- a first chamber for containing the test sample;
- a conduit between said first chamber and said fine adjustment valve;
- a first shut-off valve to control said conduit;
- a first pressure sensor to detect the difference between the pressure in the chamber and a first reference pressure;
- means to open said first shut-off valve when the pressure difference reaches a first pre-adjusted level; and
- means to close said first shut-off valve when said first reference pressure is reached in said first chamber;
- a spherical gas distributor provided with an exhaust orifice leading to the atmosphere;
- said distributor positioned either in place of said fine adjustment valve or in the direction of flow after said fine adjustment valve.

4. An apparatus for measuring gas metabolism or changes in gaseous amounts of a test sample in a chamber wherein makeup oxygen or another gas is supplied into the chamber over a long period of time from a constant pressure compressed gas source comprising:
- a compressed gas container having a fine adjustment regulating valve;
- a first chamber for containing the test sample;
- a conduit between said first chamber and said fine adjustment valve;
- a first shut-off valve to control said conduit;
- a first pressure sensor to detect the difference between the pressure in the chamber and a first reference pressure;
- means to open said first shut-off valve when the pressure difference reaches a first pre-adjusted level; and
- means to close said first shut-off valve when said first reference pressure is reached in said first chamber;
- a variable volume container positioned in the direction of flow after said fine adjustment valve;
- said container being sealed by a counter weighted bellows means;
- means to detect the varying volume of said container;
- a third shut-off valve mounted between said fine adjustment valve and said container; and
- means to open and shut said third valve as a function of the varying volume of said container.

5. An apparatus according to claim 4 wherein said bellows means is connected to a moving coil instrument.

6. An apparatus according to claim 1, further comprising:
- means to determine the number of actuations of said first shut-off valve; and
- means to open said second shut-off valve when a preset number of first shut-off valve actuations has been obtained.

7. An apparatus according to claim 2 wherein said first chamber containing the test sample, said interim storage chamber and said manometer chamber are each of approximately the same volume.

8. An apparatus according to claim 7 further comprising volume containing elements in said interim storage chamber which correspond to the volume of the test sample stored in said first chamber.

9. An apparatus according to claim 2 further comprising means for air or gas circulation within each of the three chambers for ensuring an even temperature distribution in said chambers.

10. An apparatus according to claim 9 wherein said means for circulation is a propellor.

11. An apparatus according to claim 9 wherein said means for circulation is a vibrator.

12. An apparatus according to claim 1 wherein said first pressure sensor is a liquid manometer containing Brodie's solution and said second pressure sensor is a mercury manometer.

13. An apparatus according to claim 2 further comprising means located in each of the three chambers for maintaining the temperature in the chambers constant.

14. An apparatus according to claim 1 further comprising means for withdrawing a calibrated amount of gas from said first chamber in order to set the first preadjusted level of pressure difference with respect to said first reference pressure.

15. An apparatus according to claim 2 wherein the three chambers are made of Jena glass.

* * * * *